US012539740B2

(12) United States Patent
Bacher

(10) Patent No.: US 12,539,740 B2
(45) Date of Patent: Feb. 3, 2026

(54) LOW SOUND EMISSION FLOW DIFFUSOR AS WELL AS AIR CONDITIONING SYSTEM COMPRISING THE SAME

(71) Applicant: MAHLE International GmbH, Stuttgart (DE)

(72) Inventor: Christof Bacher, Heimerdingen (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 426 days.

(21) Appl. No.: 17/892,069

(22) Filed: Aug. 20, 2022

(65) Prior Publication Data
US 2023/0054931 A1   Feb. 23, 2023

(30) Foreign Application Priority Data
Aug. 20, 2021   (DE) ................. 10 2021 209 198.9

(51) Int. Cl.
*B60H 1/34* (2006.01)
*B60H 1/00* (2006.01)

(52) U.S. Cl.
CPC ............ *B60H 1/345* (2013.01); *B60H 1/3421* (2013.01); *B60H 2001/006* (2013.01)

(58) Field of Classification Search
CPC ............................. B60H 1/345; B60H 1/3421; B60H 2001/006; B60H 1/00564
USPC .......................................... 181/224; 454/262
See application file for complete search history.

(56) References Cited

U.S. PATENT DOCUMENTS

| | | | | | |
|---|---|---|---|---|---|
| 4,236,598 | A | * | 12/1980 | Wirt | F24F 13/24 181/231 |
| 6,009,705 | A | * | 1/2000 | Arnott | G10K 11/172 60/322 |
| 6,199,657 | B1 | * | 3/2001 | Misawa | F02M 35/1227 181/224 |
| 6,719,078 | B2 | * | 4/2004 | Nakamura | F02M 35/10013 454/906 |

(Continued)

FOREIGN PATENT DOCUMENTS

| | | | | |
|---|---|---|---|---|
| DE | 10130743 | C1 * | 1/2003 | ........... B60H 1/2203 |
| DE | 112015005239 | T5 | 9/2017 | |

(Continued)

OTHER PUBLICATIONS

Machine Translation of DE112015005239T5 (Year: 2017).*

(Continued)

*Primary Examiner* — Forrest M Phillips
*Assistant Examiner* — Jennifer B Olson
(74) *Attorney, Agent, or Firm* — Barnes & Thornburg LLP

(57) ABSTRACT

A low sound emission flow diffuser includes a diffuser housing, which limits or forms an installation space, through which a flow path for an air flow of air extends, starting at an inlet opening, which is limited or formed by the diffuser housing on its inflow side, to an outlet opening, which is limited or formed by the diffuser housing on its outflow side. The flow diffuser has a multi-piece, optionally three-piece, flow manipulator, which extends along the flow path between the inlet opening and the outlet opening, for absorbing airborne sound. The disclosure additionally relates to an air conditioning system of a motor vehicle including at least one such low sound emission flow diffuser.

15 Claims, 2 Drawing Sheets

(56) References Cited

U.S. PATENT DOCUMENTS

| | | | | |
|---|---|---|---|---|
| 6,814,182 B2 * | 11/2004 | Dausch | ............. | F02M 35/1216 |
| | | | | 181/224 |
| 9,534,525 B2 * | 1/2017 | Dalimonte | .......... | B01F 25/4314 |
| 9,802,464 B2 * | 10/2017 | Benamira | ............ | B60H 1/3442 |
| 10,543,732 B2 | 1/2020 | Nakanishi | | |
| 2016/0229262 A1 | 8/2016 | Yamanaka et al. | | |
| 2018/0029441 A1 | 2/2018 | Nakanishi | | |

FOREIGN PATENT DOCUMENTS

| | | | | |
|---|---|---|---|---|
| DE | 112016001733 T5 | 1/2018 | | |
| EP | 2314470 B1 * | 4/2014 | ......... | B60H 1/00564 |
| JP | 2016141380 A | 8/2016 | | |
| KR | 20190072417 A | 6/2019 | | |
| WO | 2016079977 A1 | 5/2016 | | |
| WO | 2020190227 A1 | 9/2020 | | |

OTHER PUBLICATIONS

Machine Translation of EP-2314470-B1 (Year: 2014).*
Machine translation of DE_10130743_C1 (Year: 2003).*
Chinese Firstt Office Action and Search Report with English translation, dated Mar. 29, 2025, Application No. 202211006647.6, 22 pages.

* cited by examiner

LOW SOUND EMISSION FLOW DIFFUSOR AS WELL AS AIR CONDITIONING SYSTEM COMPRISING THE SAME

CROSS REFERENCE TO RELATED APPLICATIONS

This application claims priority to German patent application DE 10 2021 209 198.9, filed Aug. 20, 2021, the entire content of which is incorporated herein by reference.

TECHNICAL FIELD

The disclosure relates to a low sound emission flow diffuser as well as an air conditioning system comprising at least one such flow diffuser.

BACKGROUND

Known motor vehicle air conditioning systems with flow diffusers are relatively noisy during operation, even though less noisy motor vehicle air conditioning systems are desired due to the quieter motor vehicle operation associated with the conversion to electric drives.

SUMMARY

It is an object of the disclosure is to provide an improved or at least a different flow diffuser.

This object is achieved by a low sound emission flow diffuser and an air conditioning system of a motor vehicle as described herein.

A general idea of the disclosure is to absorb airborne sound in a flow diffuser with flow-effective components, which are arranged inside the flow diffuser.

For this purpose, the disclosure proposes a low sound emission flow diffuser, in particular a flow diffuser for an air conditioning system of a motor vehicle, which has a diffuser housing, which limits or forms an installation space. A flow path for an air flow of air extends through the installation space, namely starting at an inlet opening for air, which is limited or formed by the diffuser housing on its inflow side, to an outlet opening for air, which is limited or formed by the diffuser housing on its outflow side. The flow diffuser further has a multi-piece, optionally three-piece, flow manipulator, which extends along the flow path between the inlet opening and the outlet opening, for absorbing airborne sound. The multi-piece flow manipulator of the flow diffuser can be produced cost-efficiently and effects an absorption of airborne sound inside the diffuser housing as well as a reduction of pressure losses inside the diffuser housing, so that the sound emission of the flow diffuser according to the disclosure is relatively low. In practice, the low sound emission flow diffuser according to the disclosure can be integrated in an air conditioning system of a motor vehicle. There, the low sound emission flow diffuser according to the disclosure can absorb airborne sound, which is emitted, for example, by an air conditioning system fan of the air conditioning system arranged upstream of the flow diffuser and which is carried into the low sound emission flow diffuser according to the disclosure with the air flow of air with the flow manipulator and can realize a reduction of pressure losses. This has the technical advantage that an air conditioning system equipped with a low sound emission flow diffuser according to the disclosure operates with relatively low noise and energy-efficiently. During the operation of a motor vehicle, passengers of the motor vehicle can thus perceive a corresponding air conditioning system less or virtually not at all, an improved riding comfort is thus attained.

It is advantageously provided that the flow manipulator has a separate air inflow, through which air can flow, for guiding an air flow, which flows in through the inlet opening, in particular from an air conditioning system fan arranged upstream of the low sound emission flow diffuser, at least one separate guide vane, around which air can flow, for guiding the air flow, and a separate pressure aperture, through which air can flow, for generating a pressure gradient inside the air flow. The air inflow, the at least one guide vane, as well as the pressure aperture cooperate fluidically so that an absorption of airborne sound inside the diffuser housing and simultaneously a reduction of pressure losses inside the diffuser housing is attained. During operation with an air conditioning system equipped with the low sound emission flow diffuser, the latter thus advantageously does not emit any or at least virtually no interfering noise.

It is further advantageously provided that the at least one guide vane passes through the pressure aperture with contact. The at least one guide vane and the air inflow can further be spaced apart from one another transversely with respect to the flow path. The at least one guide vane and the air inflow are thereby advantageously arranged in a contact-free manner to one another, i.e. are embodied separately from one another and are arranged at a distance from one another. The pressure aperture and the air inflow can further be spaced apart from one another longitudinally with respect to the flow path. The pressure aperture and the air inflow are thereby advantageously arranged in a contact-free manner to one another, i.e., are embodied separately from one another and are arranged at a distance from one another. An advantageous arrangement of the components of the flow manipulator is thus specified.

It is advantageously provided that the air inflow, the at least one guide vane, and the pressure aperture are in each case arranged with contact on the diffuser housing. It can be advantageous in this context when the air inflow is arranged and fixed, optionally releasably inserted, on the inflow side, and protrudes freely into the installation space. In the alternative or in addition, the at least one guide vane can be arranged and fixed, optionally releasably inserted, on the inflow side and on the outflow side, wherein it extends completely through the installation space along the flow path. The diffuser housing can further have longitudinal sides connecting the inflow side and the outflow side to one another, wherein the pressure aperture is arranged and fixed, optionally releasably inserted, on at least one, preferably on all, longitudinal sides. A further advantageous arrangement of the components of the flow manipulator is thus specified, with which an advantageous airborne sound absorption can be attained.

It is advantageous when, starting at the inlet opening, the air inflow extends into the installation space in a running distance, which runs parallel to the flow path and extends from the inlet opening to the outlet opening, over ⅓ (33%) of this running distance. It goes without saying that the air inflow can also extend into the installation space within a certain tolerance range around this specification, without leaving the scope of the disclosure, for example within a tolerance range of +/−20% around ⅓ (33%). A preferred component length of the air inflow is thus specified, with which an advantageous guidance of the air flow of air, which flows into the diffuser housing, can be realized.

It is further advantageous when the air inlet has an inflow for the inflow of air and an outlet for the outflow of air. The flow path thereby advantageously extends through the air inflow, starting at the inlet, to the outlet, so that air can flow through the latter. With its inlet, the air inflow can furthermore be arranged on the inflow side so that an inlet mouth, which is limited by the inlet, is located opposite the inlet opening. The air flow, which flows through the inlet opening of the diffuser housing, can thus flow into the air inflow. In the alternative or in addition, the air inflow can protrude freely into the installation space, starting at the inflow side, in particular the inlet opening, along the flow path in the direction of the outlet opening by forming a cantilever section, through which air can flow and around which air can flow on all sides.

A free end of the cantilever section can thereby form or have the outlet. This outlet preferably limits an outlet mouth, which faces the pressure aperture on the opposite side. An angle, which lies in the range of from equal to or greater than 0° to less than or equal to 90°, preferably less than or equal to 45°, is advantageously spanned between the outlet mouth and the pressure aperture. A preferred structural embodiment for an air inflow is thus specified.

It is furthermore advantageous when the air inflow is formed with a, in particular monolithic, polygonal tube with polygonal tube base area, through which air can flow, or with a, in particular monolithic, rectangular tube with rectangular tube base area, through which air can flow. A cost-efficient embodiment for an air inflow is thus specified.

It is further advantageous when the diffuser housing is embodied in multiple pieces and has at least one first housing part, which is identified as upper shell, and a second housing part, which is identified as lower shell, wherein the air inflow is fixed to, optionally releasably inserted into, the upper shell and/or the lower shell. A preferred installation position on the diffuser housing is thus specified for an air inflow.

It is further advantageous when the at least one guide vane is embodied in a bent manner. The at least one guide vane thus advantageously guides the air flow of air in a curve or deflects it, respectively, so that the flow path for the air flow is quasi bent. This has in particular the technical advantage that a guidance of the air from the inlet opening to the outlet opening of the diffuser housing is also possible when inlet opening and outlet opening are arranged at an angle to one another.

It is further advantageous when the at least one guide vane is arranged on the inflow side in the region of the inlet opening and, starting at the inflow side, in particular the inlet opening, extends completely through the installation space along the flow path. The at least one guide vane can thereby be guided so that it passes through the pressure aperture by forming a point of penetration, wherein an angle in the range of between 45° and 90°, in particular a right angle, is spanned on the or in the region of said point of penetration between the pressure aperture and the at least one guide vane. In addition, the at least one guide vane is advantageously arranged in the region of the outlet opening on the outflow side. A preferred component length of the air inflow is thus specified, with which an advantageous air guidance of the air flowing through the diffuser housing can be realized.

In order to specify a preferred installation position for at least one guide vane on the diffuser housing, it can advantageously be provided that the diffuser housing is embodied in multiple pieces and has a first housing part identified as upper shell and a second housing part identified as lower shell, wherein the at least one guide vane is fixed to, optionally releasably inserted into, the top shell and/or the lower shell.

It is further advantageous when the at least one guide vane is formed by a, in particular monolithic, flat rod. This flat rod can thereby preferably have a rectangular flat rod base area. A cost-efficient embodiment for a guide vane is thus specified.

It is advantageous when the pressure aperture extends, in particularly completely, through the diffuser housing transversely to the flow path and has at least one aperture opening, through which air can flow. In the diffuser housing, the pressure aperture thus acts like an air separation or a partition wall, wherein the flow path extends through the at least one aperture opening. The at least one aperture opening thus creates a passage for air, wherein flow characteristics of the air flow of air, such as air flow speed, air mass flow, air volume flow as well as the air pressure can be set, in particular upstream of and downstream from the aperture opening, as a function of the placement of the respective aperture opening on the pressure aperture as well as the structural opening dimensions of the respective aperture opening. The at least one aperture opening can further be arranged in the region of a pressure aperture center of the pressure aperture or in a pressure aperture center of the pressure aperture, preferably centrally, i.e. in or in the region on a geometrical center of the pressure aperture. An advantageous pressure gradient inside the air flow can thus be realized.

It is further advantageous when the pressure aperture divides the installation space of the diffuser housing into two, fluidically separated installation space halves, which are connected to one another so as to communicate fluidically via the at least one aperture opening. Air can thus flow along the flow path from the one installation space half through the aperture opening of the pressure aperture into the other installation space half. In the alternative or in addition, a first large surface of the pressure aperture can face the inlet opening and/or an outlet of the air inlet on the opposite side, wherein a second large surface of the pressure aperture, which is oriented in the opposite direction with respect to the first large surface, faces the pressure aperture of the outlet opening on the opposite side. Further alternatively or additionally, an angle in the range of between greater than 0° and less than or equal to 45° can be spanned between said first large surface and the inlet opening. An angle in the range of between greater than 0° and less than or equal to 45° can further be spanned between said first large surface and the outlet. An angle in the range of between greater than 0° and less than or equal to 25° can further be spanned between said second large surface and the outlet opening. Preferred structural embodiments and arrangements for a pressure aperture are thus specified.

It is further advantageous when the pressure aperture has an integral or a separate annular bead, which frames the aperture opening completely on all sides. The annular bead advantageously forms quasi a raised opening edge, which runs completely around the aperture opening. In particular an advantageous pressure gradient can thus be set in the diffuser housing, so that pressure losses can be avoided.

It is further advantageous when the pressure aperture is arranged in a position in the diffuser housing, which, starting at the inlet opening, lies at ⅔ (66%) of a running distance, which extends from the inlet opening to the outlet opening, running parallel to the flow path. It goes without saying that the pressure aperture can also be arranged within a certain tolerance range around this position in the diffuser housing, without leaving the scope of the disclosure, for example within a tolerance range of +/−20% around ⅔ (66%). A preferred component position of the pressure aperture is thus specified, with which an advantageous pressure gradient can be realized.

It is advantageous when the pressure aperture has at least one drainage opening, which serves for the outflow of water accumulated in the diffuser housing. It is at least conceivable that the accumulated water flows from the one into the other installation space housing half of the diffuser housing and/or that the accumulated water flows off into a drainage channel, which is fluidically connected to the diffuser housing. Condensation, which accumulates, for example, during the operation of the flow diffuser, can thus drain off from the diffuser housing without further aids.

It can further advantageously be provided that the size and position of the at least one guide vane and/or the size and position of the aperture opening of the pressure aperture and/or the shape of the air inlet are or will be structurally determined with a flow simulation for reducing the pressure loss.

It is advantageous when the diffuser housing is embodied in multiple pieces and has a first housing part identified as upper shell and a second housing part identified as lower shell, wherein the pressure aperture is fixed to, optionally releasably inserted into, the upper shell and/or the lower shell. A preferred installation position on the diffusor housing is thus also specified for the pressure aperture.

It is advantageous when the pressure aperture is formed by a, in particular monolithic, flat plate. This flat plate can have, for example, a rectangular plate base area and can be embodied with a thickness of a few millimeters, advantageously 1 millimeter to 10 millimeters. A particularly cost-efficient embodiment for a pressure aperture is thus specified.

The disclosure can comprise the alternative or additional further basic idea of specifying an air conditioning system of a motor vehicle comprising at least one low sound emission flow diffuser according to the preceding description.

It is further advantageous when the inlet opening of the diffuser housing limits a rectangular inlet surface, which, in terms of the area, is smaller than a rectangular outlet surface, which is limited by the outlet opening of the diffuser housing. The low noise emission flow diffuser can thus attain a deceleration of the air flow of air as well as an increase of the pressure of the air of the air flow along the flow path.

It can furthermore be provided that the inlet opening and the outlet opening of the diffuser housing are arranged at an angle to one another, preferably at an angle of 25° to 135°.

In summary, it can be summarized: The present disclosure advantageously relates to a low sound emission flow diffuser, having a diffuser housing, which limits or forms an installation space, through which a flow path for an air flow of air extends, starting at an inlet opening, which is limited or formed by the diffuser housing on its inflow side, to an outlet opening, which is limited or formed by the diffuser housing on its outflow side. The flow diffuser has a multi-piece, optionally three-piece, flow manipulator, which extends along the flow path between the inlet opening and the outlet opening, and which serves the purpose of absorbing airborne sound. The disclosure furthermore advantageously relates to an air conditioning system of a motor vehicle comprising at least one such low sound emission flow diffuser.

Further important features and advantages of the disclosure follow from the subclaims, from the drawings, and from the corresponding figure description on the basis of the drawings.

It goes without saying that the above-mentioned features and the features, which will be described below, cannot only be used in the respective specified combination, but also in other combinations, or alone, without leaving the scope of the present disclosure.

Preferred exemplary embodiments of the disclosure are illustrated in the drawings and will be described in more detail in the following description, whereby identical reference numerals refer to identical or similar or functionally identical components.

BRIEF DESCRIPTION OF THE DRAWINGS

The disclosure will now be described with reference to the drawings wherein.

DESCRIPTION OF EXEMPLARY EMBODIMENTS

Figure 1:
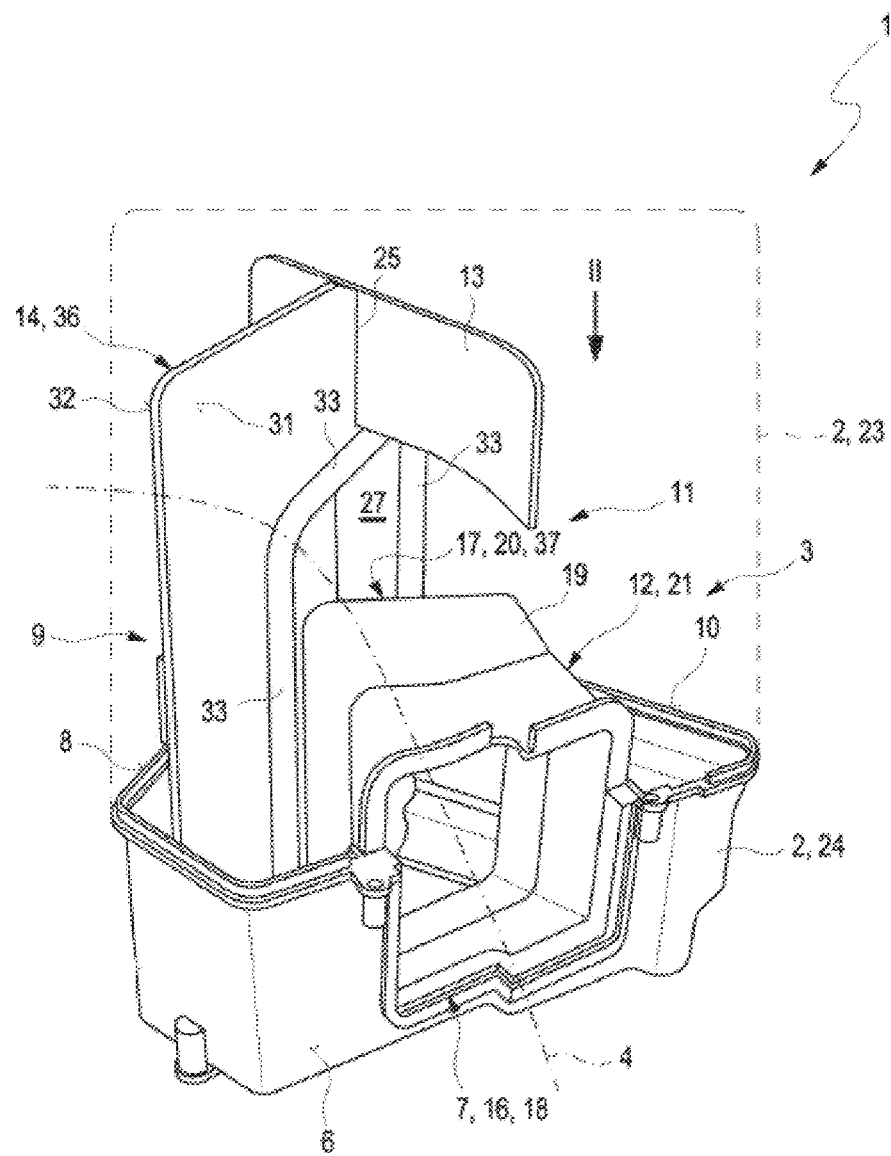
FIG. 1 shows a perspective view of a low sound emission flow diffuser according to an exemplary embodiment of the disclosure, wherein a housing part of the diffuser housing identified as upper shell of the low sound emission flow diffuser according to the disclosure has been removed to better recognize the components of the low sound emission flow diffuser according to the disclosure and is only suggested with a dashed line.
Figure 2:
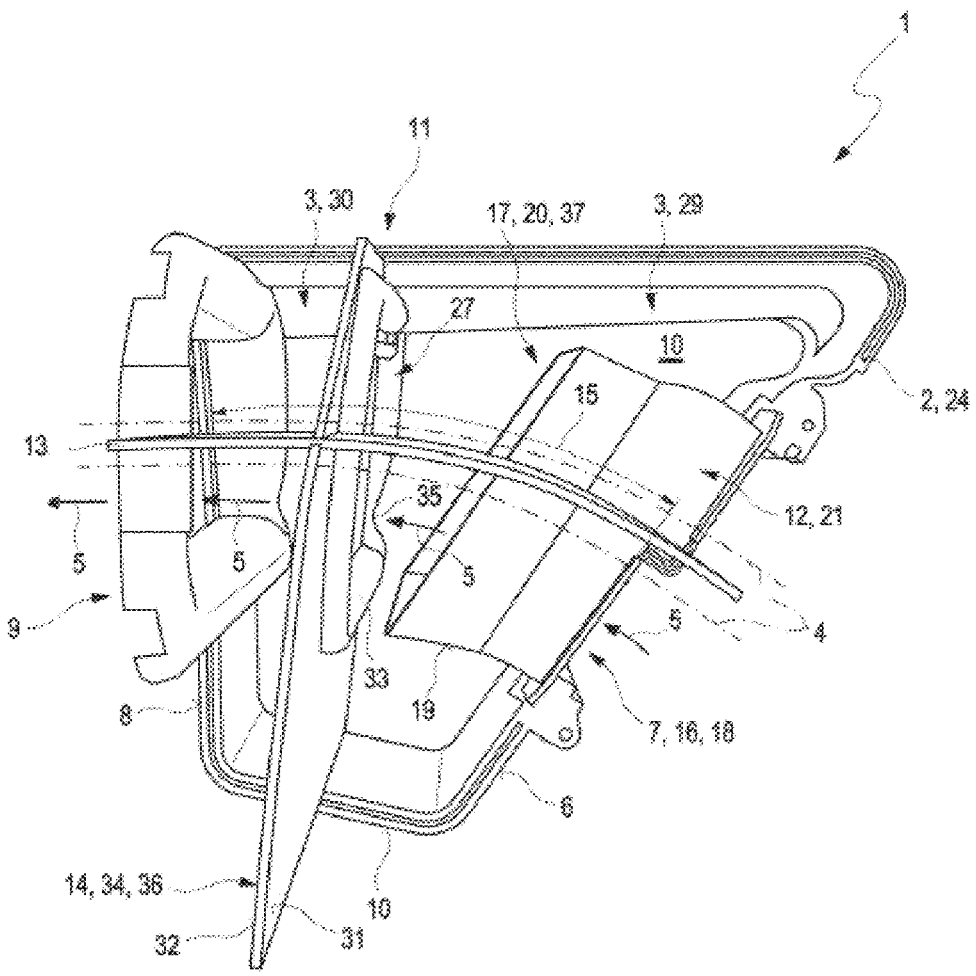
FIG. 2 shows the low sound emission flow diffuser according to the exemplary embodiment of the disclosure shown FIG. 1 in a top view according to an arrow II illustrated in FIG. 1.

FIGS. 1 and 2 show an exemplary embodiment of a low sound emission flow diffuser, which is identified as a whole with reference numeral 1, which is integrated, for example, in a non-illustrated air conditioning system of a motor vehicle downstream of an air conditioning system fan of the air conditioning system, which is likewise not illustrated.

According to FIGS. 1 and 2, the low sound emission flow diffuser 1 has a two-piece diffuser housing 2, wherein the one, upper housing part is identified in an exemplary manner as upper shell 23, and the other, lower housing part as lower shell 24. Upper shell 23 and lower shell 24 are preferably releasably fixed to one another, for example with non-illustrated releasably fixing means. In the present case, however, the upper shell 23 has been removed, as mentioned, to better recognize the components of the low sound emission flow diffuser 1 according to the disclosure and is only suggested with a dashed line. The diffuser housing 2 limits or forms an installation space 3, which is sealed in an exemplary manner against the surrounding area, a non-illustrated seal can be inserted, for example, between upper shell 23 and lower shell 24, so that unwanted leakages on the diffuser housing 2 are prevented. On inflow inlet side 6 facing the air conditioning system fan of the air conditioning system, the diffuser housing 2 limits or forms an inlet opening 7 opening out into the installation space 3, through which air can flow into the installation space 3. On its outflow side 8, the diffuser housing 2 furthermore limits or forms an outlet opening 9 opening out into the installation space 3, through which air can flow out of the installation space 3 again. Inlet opening 7 and outlet opening 9 of the diffuser housing 2 are arranged at an angle to one another, in an exemplary manner at an angle of 45° to one another.

A flow path 4, which is suggested with dot and dash lines in FIGS. 1 and 2, for an air flow 5 of air extends through the installation space 3. The flow path 4 thereby starts on or at the inlet opening 7, extends from there in bent form through the diffuser housing 2, and ends on or at the outlet opening 9. The air flow 5 of air can thus flow through the diffuser housing 2. It can further be seen that the low sound emission flow diffuser 1 has a three-piece low manipulator 11, which extends along the flow path 4 between the inlet opening 7 and the outlet opening 9, for absorbing airborne sound. The three-piece flow manipulator 11 of the flow diffuser 1 effects an absorption of airborne sound inside the diffuser housing 2 as well as a reduction of pressure losses inside the diffuser housing 2, so that the sound emission of the low sound emission flow diffuser 1 is relatively low. Airborne sound, which is emitted, for example, by the air conditioning system fan of the air conditioning system, and which is carried into the low sound emission flow diffuser 1 with the air flow 5 of air, can be absorbed with the flow manipulator 11, which has the advantage that an air conditioning system equipped with the low sound emission flow diffuser 1 can operate with relatively low noise and energy-efficiently.

In an exemplary manner, said flow manipulator 11 has a separate air inflow 12, through which air can flow, for guiding the air flow 5 of air, which flows in through the inlet opening 7, a single separate guide vane 13, around which air can flow, for guiding the air flow 5 of air, as well as a separate pressure aperture 14, through which air can flow, for generating a pressure gradient inside the air flow 5 of air.

In the present case, the air inflow 12, which is formed in an exemplary manner with a monolithic rectangular tube 21, through which air can flow, with rectangular tube base area, is fixed to the upper shell 23 and/or the lower shell 24, so that it is immovable with respect to the diffuser housing 2. On its end, the air inflow 12 has an inlet 16 for the inflow of air and an outlet 17 for the outflow of air on the opposite end, so that the air inflow 12 can be flushed by the air flow 5 of air. With its inlet 16, the air inflow 12 is furthermore arranged on the inflow side 6 of the diffuser housing 2, wherein an inlet mouth 18, which is limited by the inlet 16, is located opposite the inlet opening 7. The air flow 5 of air, which flows through the inlet opening 18 of the diffuser housing 2, can thus flow into the air inflow 12. It can in particular be seen in FIG. 2 that, starting at the inflow side 6, the air inflow 12 protrudes or cantilevers freely into the installation space 3 along the flow path 4 in the direction of the outlet opening 9 by forming a cantilever section 19, through which air can flow and around which air can flow on all sides. A free end 37 of the cantilever section 19 formed thereby forms or points to said outlet 17, wherein the latter limits an outlet mouth 20. The outlet mouth 20 faces the pressure aperture 14 on the opposite side, wherein an angle of approximately 15° is spanned between the outlet mouth 20 and the pressure aperture 14 in an exemplary manner. A distance, which is identified as running distance 15, which extends from the inlet opening 7 to the outlet opening 9 parallel to the flow path 4, is further illustrated in FIG. 2. It is provided in the present case that, starting at the inlet opening 7, the air inflow extends into the installation space 3 over ⅓ of this running distance 15.

The guide vane 13, which is formed in an exemplary manner by a monolithic flat rod with rectangular flat rod base area, is embodied in a slightly bent manner and, starting at the inflow side 6, extends completely through the installation space 3 along the flow path 4. On the one hand, the guide vane 13 is thereby fixed to the diffuser housing 2 on the inflow side 6 in the region of the inlet opening 7 and, on the other hand, on the outflow side 8 in the region of the outlet opening 9 in the region of the supper shell 23 in an exemplary manner. The guide vane 13 is furthermore guided through the diffuser housing 2 so that it passes through the pressure aperture 14 by forming a point of penetration 25. An angle of 90° is spanned in an exemplary manner on the or in the region of the point of penetration 25 between the pressure aperture 14 and the at least one guide vane 13. The guide vane 13 can thus guide the air flow 5 of air through the diffuser housing 2 in a slight curve from the inlet opening 7 to the outlet opening 9.

The pressure aperture 14, which, in the present case, is formed by a monolithic flat plate 36 with approximately rectangular plate base area extends completely through the diffuser housing 2 transversely to the flow path 4 or transversely to the air flow 5 of air, respectively, wherein it abuts tightly with its pressure aperture edge on the upper shell 23 as well as on the lower shell 24, so that the pressure aperture 14 divides the diffuser housing 2 or the installation space 3 of the diffuser housing 2, respectively, into two, fluidically separated installation space halves 29, 30. In the present case, the pressure aperture 14 has a passage for air, which is identified as aperture opening 27. According to the present exemplary embodiment, said aperture opening is arranged in the region of a or in a pressure aperture center, i.e. in the geometrical center of the pressure aperture 14, and is complete framed on all sides by an annular bead 33, which is embodied integrally with the pressure aperture 14. In the diffuser housing 2, the pressure aperture 14 thus acts like an air separation or a partition wall, wherein the flow path 4 extends through the at least one aperture opening 27, so that air can flow along the flow path 4 from the one installation space half 29 through the aperture opening 27 of the pressure aperture 14 into the other installation space half 30, so that the installation space halves 29, 30 can communicate fluidically with one another via the at least one aperture opening 27.

It can furthermore be seen in FIG. 2 that the pressure aperture 14 has two large surfaces 31, 32, which are oriented to one another in the opposite direction, wherein the one, first large surface 31 of the pressure aperture 14 faces the inlet opening 7 and the outlet 20 of the air inflow 12 on the opposite side. An angle of 10° is spanned in an exemplary manner between the first large surface 31 and the inlet opening 7, while an angle of 15° is spanned between the first large surface 31 and the outlet 20. The other, second large surface 32 of the pressure aperture 14 faces the outlet opening 9 on the opposite side, wherein an angle of 10° is spanned in an exemplary manner between the second large surface 32 and the outlet opening 9. The pressure aperture 14 is arranged in an exemplary manner in a position 34 in the diffuser housing 2, which, starting at the inlet opening 7, lies at ⅔ of the running distance 15.

Lastly, it is important to mention with respect to the pressure aperture 14 that, in addition to the aperture opening 27, it has a drainage opening 35, which serves for the outflow of water accumulated in the diffuser housing 2. It is advantageous when the accumulated water flows from the one into the other installation space half 29, 30 of the diffuser housing 2 and/or that the accumulated water flows off into a drainage channel, which is fluidically connected to the diffuser housing 2.

Due to the described shape, the air inflow 12, the guide vane 13, as well as the pressure aperture 14 of the flow manipulator 11 can cooperate fluidically so that an absorption of airborne sound inside the diffuser housing 2 and simultaneously a reduction of pressure losses inside the diffuser housing 2 can be attained.

It is understood that the foregoing description is that of the exemplary embodiments of the disclosure and that various changes and modifications may be made thereto without departing from the spirit and scope of the disclosure as defined in the appended claims.

What is claimed is:

1. A low sound emission flow diffuser for an air conditioning system of a motor vehicle, the low sound flow diffuser comprising:
a diffuser housing, which limits or forms an installation space, through which a flow path for an air flow of air extends, starting at an inlet opening, which is limited or formed by the diffuser housing on its inflow side, to an outlet opening, which is limited or formed by the diffuser housing on its outflow side,
wherein the flow diffuser has a flow manipulator, which extends along the flow path between the inlet opening and the outlet opening, for absorbing airborne sound, the flow manipulator comprises an air inlet (12) that receives air flowing from the inlet opening of the diffuser housing, a guide vane, and a pressure diaphragm (14),
wherein the guide vane is configured to promote laminar flow, wherein the guide vane is curved along its length to urge air flowing therepast to curve in a direction similar to the curve of the guide vane, wherein a first plane that is perpendicular to a direction of air flowing into the inlet opening is at an acute angle with respect to a second plane that is perpendicular to a direction of air flowing out of the inlet opening, wherein a first portion of the guide vane proximate to the inlet opening is disposed parallel to the direction of air flowing into the inlet opening and a second portion of the guide vane proximate to the outlet opening is disposed parallel to the direction of air flowing out of the outlet opening,
wherein the pressure diaphragm is disposed at a ninety degree angle with respect to the guide vane where the pressure diaphragm crosses the guide vane, wherein the pressure diaphragm comprises an aperture through which air can flow.

2. The low sound emission flow diffuser according to claim 1, wherein:
the guide vane passes through the pressure aperture with contact,
the guide vane and the air inflow are spaced apart from one another transversely with respect to the flow path, and
the pressure aperture and the air inflow are spaced apart from one another longitudinally with respect to the flow path.

3. The low sound emission flow diffuser according to claim 1, wherein the air inflow, the at least one guide vane, and the pressure diaphragm are each arranged with contact on the diffuser housing.

4. The low sound emission flow diffuser according to claim 1, wherein:
the air inflow is arranged and fixed on the inflow side, and protrudes freely into the installation space, and
the guide vane is arranged and fixed on the inflow side and on the outflow side, wherein the guide vane extends completely through the installation space along the flow path, and
the diffuser housing has longitudinal sides connecting the inflow side and the outflow side to one another, wherein the aperture is arranged and releasably inserted, on at least one longitudinal side.

5. The low sound emission flow diffuser according to claim 1, wherein:
starting at the inlet opening, the air inflow extends into the installation space in parallel to the flow path and extends from the inlet opening to the outlet opening, wherein the air inflow extends, over ⅓ of a total air flow distance within the diffuser housing.

6. The low sound emission flow diffuser according to claim 1, wherein:
the air inflow has an inlet for the inflow of air and an outlet for the outflow of air, and
with its inlet, the air inflow is arranged on the inflow side so that an inlet mouth, which is limited by the inlet, is located opposite the inlet opening, and
starting at the inflow side of the inlet opening, the air inflow protrudes freely into the installation space along the flow path in the air flow direction of the outlet opening by forming a cantilever section, through which air can flow and around which air can flow on all sides, and
a free end of the cantilever section forms the outlet, wherein the outlet limits an outlet mouth, which faces the pressure aperture on the opposite side.

7. The low sound emission flow diffuser according to claim 1, wherein the air inflow is formed with a monolithic, polygonal tube with polygonal tube base area, through which air can flow, or with a monolithic, rectangular tube with rectangular tube base area, through which air can flow.

8. The low noise emission flow diffuser according to claim 1, wherein the diffuser housing is embodied in multiple pieces and has at least one first housing part, which is identified as upper shell, and a second housing part, which is identified as lower shell, wherein the air inflow is releasably inserted into the upper shell and the lower shell.

9. The low sound emission flow diffuser according to claim 1, wherein:
the at least one guide vane is arranged on the inflow side in the region of the inlet opening and starting at the inflow side of the inlet opening, extends completely through the installation space along the flow path, wherein it passes through the aperture by forming a point of penetration, wherein an angle in the range of between 45° and 90° is spanned by in the region of the point of penetration between the pressure aperture and the at least one guide vane, and wherein the at least one guide vane is arranged in the region of the outlet opening on the outflow side.

10. The low sound emission flow diffuser according to claim 1, wherein:
the diffuser housing is embodied in multiple pieces and has a first housing part, which is identified as an upper shell, and a second housing part, which is identified as lower shell,
the at least one guide vane is releasably inserted into the top shell and the lower shell, and
the at least one guide vane is formed by a monolithic flat rod.

11. The low sound emission flow diffuser according to claim 1, wherein:
the aperture of the pressure diaphragm extends through the diffuser housing transversely to the flow path, and
the pressure diaphragm divides the installation space of the diffuser housing into two fluidically separated installation space halves, which are connected to one another through the aperture within the pressure diaphragm, and
the pressure diaphragm has an integral or a separate annular bead, which frames the aperture opening completely on all sides, the pressure diaphragm has at least one drainage opening, which serves for the outflow of water accumulated in the diffuser housing, and the pressure diaphragm is formed by a monolithic, flat plate.

12. The low sound emission flow diffuser according to claim 1, wherein the pressure diaphragm is arranged in a position in the diffuser housing, which, starting at the inlet opening, lies at ⅔ of a length of air flow through the diffuser housing, which extends from the inlet opening to the outlet opening, running parallel to the flow path.

13. The low sound emission flow diffuser according to claim 1, wherein:

the diffuser housing is embodied in multiple pieces and has a first housing part, which is identified as upper shell, and a second housing part, which is identified as lower shell, and the pressure diaphragm is releasably inserted into the upper shell and the lower shell.

14. An air conditioning system of a motor vehicle comprising at least one low sound emission flow diffuser according to claim 1.

15. The low sound emission diffuser according to claim 1, wherein the inlet opening and the outlet opening of the diffuser housing are disposed at acute angles with respect to a plane through the pressure diaphragm, wherein an angle of 10 degrees exists between the plane through the pressure diaphragm and a plane through the inlet opening that is perpendicular to a direction of air flow into the inlet opening, and wherein an angle of 15 degrees exists between the plane through the pressure diaphragm and a plane through the outlet opening that is perpendicular to a direction of air flow out of the outlet opening.

* * * * *